(12) United States Patent
Stasiak

(10) Patent No.: US 12,337,532 B2
(45) Date of Patent: Jun. 24, 2025

(54) 3-DIMENSIONAL PRINTING

(71) Applicant: PERIDOT PRINT LLC, Palo Alto, CA (US)

(72) Inventor: James William Stasiak, Corvallis, OR (US)

(73) Assignee: Peridot Print LLC, Palo Alto, CA (US)

( * ) Notice: Subject to any disclaimer, the term of this patent is extended or adjusted under 35 U.S.C. 154(b) by 215 days.

(21) Appl. No.: 17/540,048

(22) Filed: Dec. 1, 2021

(65) Prior Publication Data

US 2022/0088859 A1    Mar. 24, 2022

Related U.S. Application Data

(62) Division of application No. 16/073,238, filed as application No. PCT/US2017/028413 on Apr. 19, 2017, now Pat. No. 11,241,828.

(30) Foreign Application Priority Data

Apr. 28, 2016 (WO) ................ PCT/US2016/029038
Apr. 28, 2016 (WO) ................ PCT/US2016/029857
Jul. 28, 2016 (WO) ................ PCT/US2016/044369

(51) Int. Cl.
  *B29C 64/165* (2017.01)
  *B29K 75/00* (2006.01)
  (Continued)

(52) U.S. Cl.
  CPC ............ *B29C 64/165* (2017.08); *B33Y 70/10* (2020.01); *C09D 7/61* (2018.01); *B29K 2075/00* (2013.01);
  (Continued)

(58) Field of Classification Search
  CPC ........ B29K 2075/00; B29K 2105/0058; B29K 2995/0035; B29C 64/165; B33Y 30/00; B33Y 70/10; B33Y 10/00; C09D 7/61
  See application file for complete search history.

(56) References Cited

U.S. PATENT DOCUMENTS 5,351,151 A    9/1994  Levy
5,993,854 A   11/1999  Needleman et al.
         (Continued)

FOREIGN PATENT DOCUMENTS

CN         1950192 A     4/2007
CN         1976799 A     6/2007
         (Continued)

OTHER PUBLICATIONS

Casey Check et al.—Inkjet printing of 3D nano-composites formed by phtotopolymerization of an acrylate monomer—Copyright 2015 Published by Elsevier B.V., 2 pages.
(Continued)

*Primary Examiner* — Xiao S Zhao
*Assistant Examiner* — Victoria Bartlett
(74) *Attorney, Agent, or Firm* — Dierker & Kavanaugh, P.C.

(57) ABSTRACT

The present disclosure relates a method of 3-dimensional printing a printed part. The method comprises printing an inkjet dopant composition at selected locations on a layer of build material comprising polymer particles. The inkjet dopant composition comprises a dopant dispersed or dissolved in a liquid carrier. Polymer particles at selected areas of the layer of build material are then fused to form a fused polymer layer comprising the dopant. The selected areas of the layer of build material include areas of the layer of build material that have not been printed with the inkjet dopant composition.

16 Claims, 5 Drawing Sheets

(51) Int. Cl.
  *B29K 105/00* (2006.01)
  *B33Y 10/00* (2015.01)
  *B33Y 30/00* (2015.01)
  *B33Y 70/10* (2020.01)
  *C09D 7/61* (2018.01)
(52) U.S. Cl.
  CPC ............. *B29K 2105/0058* (2013.01); *B29K 2995/0035* (2013.01); *B33Y 10/00* (2014.12); *B33Y 30/00* (2014.12)

(56) References Cited

U.S. PATENT DOCUMENTS

| | | | |
|---|---|---|---|
| 6,363,606 | B1 | 4/2002 | Johnson et al. |
| 6,589,471 | B1 | 7/2003 | Khoshnevis |
| 6,599,444 | B2 | 7/2003 | Burnell-Jones |
| 6,726,952 | B1 | 4/2004 | Dimond et al. |
| 7,365,129 | B2 | 4/2008 | Kramer et al. |
| 7,919,018 | B2 | 4/2011 | Williams et al. |
| 7,972,426 | B2 | 7/2011 | Hinch et al. |
| 8,623,951 | B2 | 1/2014 | Kambe |
| 9,281,186 | B2 | 3/2016 | Wootton |
| 9,313,360 | B2 | 4/2016 | Morovic et al. |
| 10,375,765 | B2 | 8/2019 | Chaffins et al. |
| 2004/0126567 | A1 | 7/2004 | Dimond et al. |
| 2004/0137228 | A1 | 7/2004 | Monsheimer et al. |
| 2005/0003189 | A1 | 1/2005 | Bredt et al. |
| 2005/0042453 | A1 | 2/2005 | James et al. |
| 2005/0057245 | A1 | 3/2005 | Miya |
| 2005/0072113 | A1 | 4/2005 | Collins et al. |
| 2005/0105191 | A1 | 5/2005 | Baer et al. |
| 2006/0046093 | A1 | 3/2006 | Landry et al. |
| 2006/0060857 | A1 | 3/2006 | Mardilovich et al. |
| 2006/0290032 | A1 | 12/2006 | Sano |
| 2007/0183918 | A1 | 8/2007 | Monsheimer et al. |
| 2007/0238056 | A1 | 10/2007 | Baumann et al. |
| 2007/0241482 | A1 | 10/2007 | Giller et al. |
| 2008/0122141 | A1 | 5/2008 | Bedal et al. |
| 2008/0149164 | A1 | 6/2008 | Goedmakers et al. |
| 2008/0192074 | A1 | 8/2008 | Dubois et al. |
| 2009/0004381 | A1 | 1/2009 | Fujisawa et al. |
| 2009/0215209 | A1 | 8/2009 | Anc et al. |
| 2009/0256273 | A1 | 10/2009 | Yu |
| 2010/0007692 | A1* | 1/2010 | Vanmaele ............ B41C 1/003 522/101 |
| 2010/0032935 | A1 | 2/2010 | Heer et al. |
| 2010/0140550 | A1 | 6/2010 | Keller et al. |
| 2011/0049865 | A1 | 3/2011 | Bray |
| 2011/0217544 | A1 | 9/2011 | Young et al. |
| 2012/0106437 | A1 | 5/2012 | Seo et al. |
| 2012/0130530 | A1 | 5/2012 | Yasukochi |
| 2012/0202022 | A1 | 8/2012 | Schulze-Hagenest |
| 2014/0261031 | A1 | 9/2014 | Kellar et al. |
| 2014/0263667 | A1 | 9/2014 | Mege |
| 2014/0263674 | A1 | 9/2014 | Cerveny |
| 2014/0275317 | A1 | 9/2014 | Moussa |
| 2015/0224711 | A1 | 8/2015 | Kodama et al. |
| 2015/0235069 | A1 | 8/2015 | Kumar et al. |
| 2015/0251247 | A1* | 9/2015 | Monsheimer ......... B28B 1/001 425/174 |
| 2015/0258770 | A1 | 9/2015 | Chan et al. |
| 2015/0291921 | A1 | 10/2015 | Rives |
| 2015/0343673 | A1 | 12/2015 | Williams |
| 2015/0361286 | A1 | 12/2015 | Williams |
| 2016/0054474 | A1 | 2/2016 | Harmon |
| 2016/0067659 | A1 | 3/2016 | Williams |
| 2016/0167299 | A1 | 6/2016 | Jallouli et al. |
| 2016/0229119 | A1 | 8/2016 | Renn |
| 2016/0257071 | A1 | 9/2016 | Okamoto |
| 2016/0322703 | A1 | 11/2016 | Jesme et al. |
| 2016/0339636 | A1 | 11/2016 | De et al. |
| 2017/0028618 | A1 | 2/2017 | Robeson et al. |
| 2017/0145155 | A1 | 5/2017 | Wright et al. |
| 2017/0225396 | A1 | 8/2017 | Tom et al. |
| 2017/0239889 | A1 | 8/2017 | Ganapathiappan et al. |
| 2017/0247552 | A1 | 8/2017 | Prasad et al. |
| 2017/0247553 | A1 | 8/2017 | Ganapathiappan et al. |
| 2018/0015663 | A1 | 1/2018 | Zhao et al. |
| 2019/0022930 | A1 | 1/2019 | Hinch et al. |
| 2019/0137664 | A1 | 5/2019 | Stasiak |

FOREIGN PATENT DOCUMENTS

| | | |
|---|---|---|
| CN | 101019059 A | 8/2007 |
| CN | 101102905 A | 1/2008 |
| CN | 101556345 A | 10/2009 |
| CN | 101819647 A | 9/2010 |
| CN | 101870218 A | 10/2010 |
| CN | 103755889 A | 4/2014 |
| CN | 103991217 A | 8/2014 |
| CN | 104149350 A | 11/2014 |
| CN | 204036857 U | 12/2014 |
| CN | 105346089 A | 2/2016 |
| CN | 105392618 A | 3/2016 |
| EP | 1666234 A1 | 6/2006 |
| EP | 2952360 A1 | 12/2015 |
| EP | 2969482 A1 | 1/2016 |
| JP | 04-099203 A | 3/1992 |
| JP | 08-156393 A | 6/1996 |
| JP | 2000-234104 A | 8/2000 |
| JP | 2003-504199 A | 2/2003 |
| JP | 2005-254534 A | 9/2005 |
| JP | 2006-274077 A | 10/2006 |
| JP | 2007-100062 A | 4/2007 |
| JP | 2007-529340 A | 10/2007 |
| JP | 2007-534524 A | 11/2007 |
| JP | 2009-298146 A | 12/2009 |
| JP | 2010-001425 A | 1/2010 |
| JP | 2011-129787 A | 6/2011 |
| JP | 2012-106437 A | 6/2012 |
| JP | 2015-112836 A | 6/2015 |
| JP | 2015-171781 A | 10/2015 |
| JP | 2015-174426 A | 10/2015 |
| JP | 2015-221526 A | 12/2015 |
| JP | 2017-057467 A | 3/2017 |
| JP | 2017-510475 A | 4/2017 |
| KR | 10-2014-0069021 | 6/2014 |
| KR | 2014-0069021 A | 6/2014 |
| WO | 00/41673 A1 | 7/2000 |
| WO | 01/38061 A1 | 5/2001 |
| WO | 2004/063295 A1 | 7/2004 |
| WO | 2005/057245 A2 | 6/2005 |
| WO | 2005/090055 A1 | 9/2005 |
| WO | 2014/076049 A1 | 5/2014 |
| WO | 2014/152531 A1 | 9/2014 |
| WO | 2015/056232 A1 | 4/2015 |
| WO | 2015/063399 A1 | 5/2015 |
| WO | 2015/102938 A1 | 7/2015 |
| WO | 2015/106816 A1 | 7/2015 |
| WO | 2015/108544 A1 | 7/2015 |
| WO | 2015/164234 A1 | 10/2015 |
| WO | 2015/167530 A2 | 11/2015 |
| WO | 2016/048375 A1 | 3/2016 |
| WO | WO2016/048380 A1 * | 3/2016 |
| WO | 2016/053248 A1 | 4/2016 |
| WO | 2016/053305 A1 | 4/2016 |
| WO | 2016/175817 A1 | 11/2016 |
| WO | 2017/156415 A1 | 9/2017 |
| WO | 2017/188961 A1 | 11/2017 |
| WO | 2017/188963 A1 | 11/2017 |
| WO | 2018/022051 A1 | 2/2018 |

OTHER PUBLICATIONS

David A Roper et al: "Additive manufacturing of graded dielectrics", Smart Materials and Structures, vol. 23 Mar. 6, 2014 (Mar. 6, 2014), pp. 1-9.

Doubrovski, E. et al., Voxel-based fabrication through material property mapping: A design method for bitmap printing, Mar. 2015, <http://www.sciencedirect.com/science/article/pii/S0010448514001067>.

(56) References Cited

OTHER PUBLICATIONS

Golembiewski, K., At RAPID, HP Shows Production-Ready 3D Printing System, May 17, 2016,< : http://www.sme.org/MEMagazine/Article.aspx?id=8589939443 >.

HP Delivers World's First Production-Ready 3D Printing System, May 17, 2016, <:http://m.hp.com/us/en/news/details.do?id=2243327&articletype=news_release >.

Primir, "Emerging Printing Technologies & Applications", Pivotal Resources, 2014, 2 pages.

Siemens to Collaborate with HP Inc. to Elevate 3D Printing from Prototyping to Full Production, May 17, 2016, 2 pages.

Tang Jinfa, "Thin Film Optics and Technology", Jun. 30, 1989, pp. 153-155, China Machine Press.

Zhou. The broad emission at 785 nm in YAG:Ce $3+$ ,Cr $3+$ phosphor. Sep. 2017 Spectrochimica Acta Part A Molecular and Biomolecular Spectroscopy 190 (Year: 2017).

\* cited by examiner

3-DIMENSIONAL PRINTING

CROSS-REFERENCE TO RELATED APPLICATIONS

This application is a divisional application of U.S. application Ser. No. 16/073,238, filed Jul. 26, 2018, which itself is a national stage entry under 35 U.S.C. § 371 of PCT/US2017/028413, filed Apr. 19, 2017, which itself claims priority to PCT/US2016/029857, filed Apr. 28, 2016 and to PCT/US2016/029838, filed Apr. 28, 2016, and to PCT/US2016/044369, filed Jul. 28, 2016, each of which is incorporated by reference herein in its entirety.

BACKGROUND 3-dimensional (3D) printing or additive manufacturing refers to a printing process in which successive layers of material are formed under computer control to create an object. Various methods of 3D printing have been developed, including heat-assisted extrusion, selective laser sintering (SLS), fused deposition modeling (FDM), high speed sintering (HSS) and photolithography.

BRIEF DESCRIPTION OF THE DRAWINGS

Various features will be described, by way of example only, with reference to the following figures, in which.

DETAILED DESCRIPTION

Figure 1:
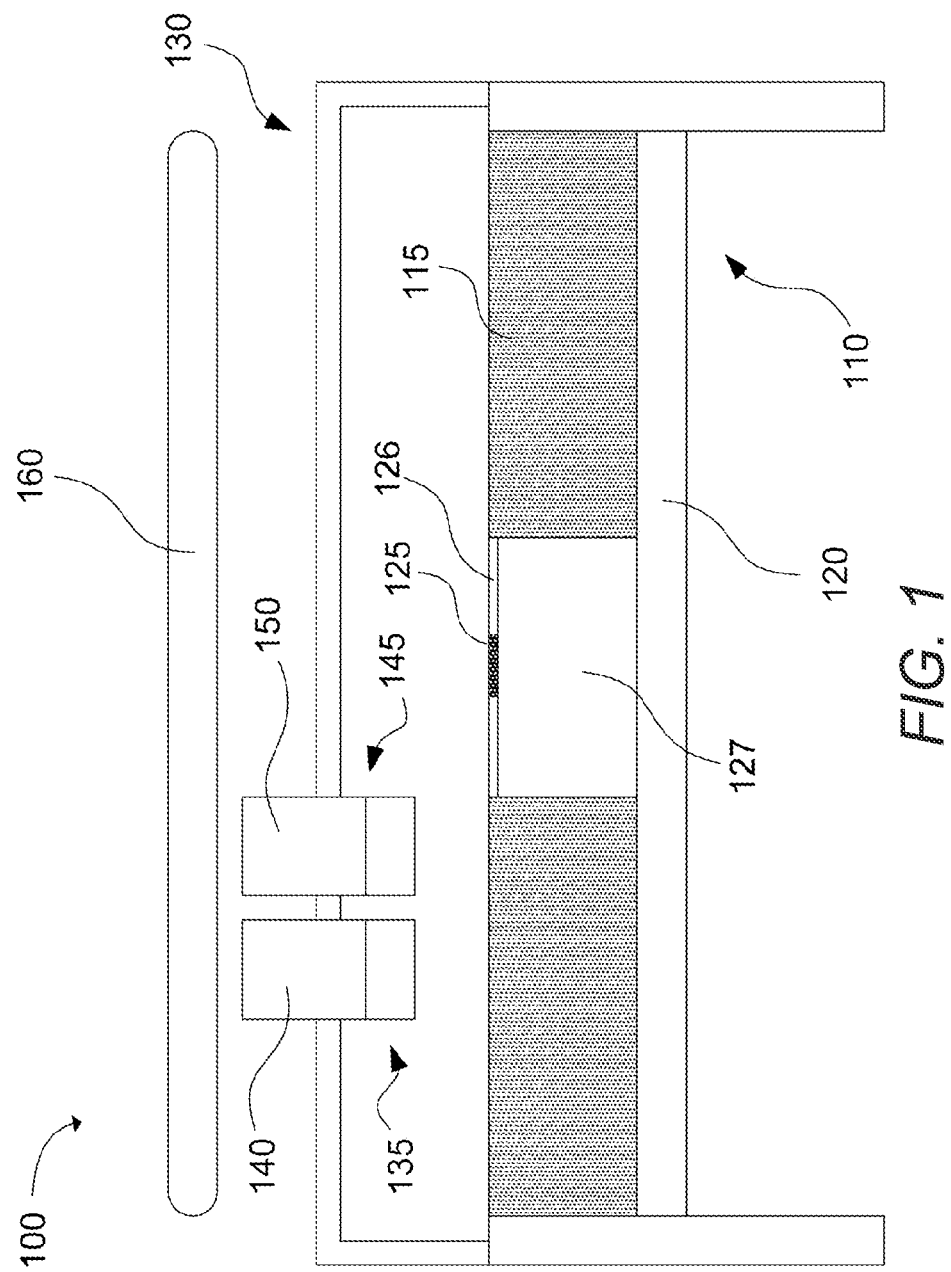
FIG. 1 is a schematic view of an example of a 3-dimensional printing system.

It is to be understood that this disclosure is not limited to the particular process steps and materials disclosed herein because such process steps and materials may vary. It is also to be understood that the terminology used in this disclosure is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "liquid vehicle" or "ink vehicle" refers to a liquid in which additive is placed to form an inkjet composition. A wide variety of liquid vehicles may be used with the systems and methods of the present disclosure. A variety of different agents, including, surfactants, solvents, co-solvents, anti-kogation agents, buffers, biocides, sequestering agents, viscosity modifiers, and surface-active agents may be dispersed or dissolved in the liquid vehicle.

The term "fusing agent" is used herein to describe agents that may be applied to particulate build material, and which may assist in fusing the build material to form a layer of a 3D part. Heat may be used to fuse the build material, but the fusing agent can also assist in binding powder together, and/or in generating heat from electromagnetic energy. For example, a fusing composition may include a fusing agent that can bind the build material together in preparation for heating to fuse the materials together, or may be an additive that becomes energized or heated when exposed to a frequency or frequencies of electromagnetic radiation. Any additive that assists in fusing particulate build material to form the 3D printed part can be used.

As used herein, "jet," "jettable," "jetting," or the like refers to compositions that are ejected from jetting architecture, such as inkjet architecture. Inkjet architecture can include thermal or piezo drop on demand architecture, as well as continuous inkjet architecture. Additionally, such architecture can be configured to print varying drop sizes, for example, less than 50 picolitres (pl), less than 40 pl, less than 30 pl, less than 20 pl, less than 10 pl. In some examples, the drop size may be 1 to 40 pl, for example, 3 or 5 to 30 picolitres.

A "voxel" is the basic volumetric building block used to fabricate three-dimensional objects. Mathematically, a voxel is determined by two spatial parameters in the x-y coordinate plane and a third parameter which determines the voxel's depth, z. Each layer printed has as many voxels as can be printed, the minimum size of the voxel being limited the drop size of the printed fluid.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

The present disclosure relates a method of 3-dimensional printing a printed part. The method comprises printing an inkjet dopant composition at selected locations on a layer of build material comprising polymer particles. The inkjet dopant composition comprises a dopant dispersed or dissolved in a liquid carrier. Polymer particles at selected areas of the layer of build material are then fused to form a fused polymer layer comprising the dopant. The selected areas of the layer of build material include areas of the layer of build material that have not been printed with the inkjet dopant composition.

The method may further comprise forming a further layer of build material over the fused polymer layer comprising the dopant. Polymer particles at selected areas of the further layer of build material may be fused to form a fused polymer layer that is devoid of dopant. Alternatively, an inkjet dopant composition may be printed on the further layer of build material prior to the fusing step. Polymer particles at selected areas of the further layer of build material may then be fused to form a further fused polymer layer comprising the dopant.

The present disclosure also relates to a 3-dimensional printing material set comprising a particulate build material comprising thermoplastic polymer particles. The set also comprises an inkjet dopant composition comprising a dopant dispersed in a liquid carrier. The dopant comprises particles (e.g. nanoparticles) that are selected from at least one of photoluminescent particles, dielectric particles, magnetic particles, ceramic particles, semi-conductor particles, and electrically-conducting particles. The inkjet dopant composition also comprises an inkjet fusing composition comprising a fusing agent capable of absorbing electromagnetic radiation to produce heat. In some examples, the thermoplastic polymer particles have an average particle size of 10 to 100 μm.

In 3-dimensional printing, a layer of build material comprising polymer particles may be applied e.g. to a print platform. Selected areas of the layer of build material may then be fused to form a solid layer. In some examples, a fusing composition may be printed onto the selected areas of the layer of build material. Fusing agent in the fusing composition may cause the build material in the selected areas to fuse to form a solid layer. A new layer of build material may then be applied over the solid layer and the process repeated until a complete 3-D part is printed.

In the present disclosure, it has been found that dopants can be introduced at specific locations within the printed part by inkjet printing. For example, because droplet size and print location can be controlled, inkjet compositions containing dopants can be printed in selected amounts at selected locations over the unfused polymer layer. These selected locations may be selected by computer control. Thus, specific voxels may be selected for printing. When the polymer is fused, the dopants become incorporated into the layer at the selected locations. The fused polymer layer containing or incorporating the dopant may be a doped composite layer or dopant composite layer. Dopants can be selected to provide e.g. conductivity, photoluminescence, magnetism, elasticity and/or tensile strength at specific locations, allowing characteristics of the printed part to be tailored at a voxel level. The doped build material may be a doped composite material.

In some examples, the dopant composition is printed droplet by droplet, wherein each droplet has a volume of 1 to 50 pl, for example, 2 to 30 pl or 5 to 20 pl. This can allow the dopant to be printed, in for example, in patterns (e.g. intricate patterns) throughout the printed part.

In some examples, the dopant may become embedded in the printed part at selected locations. The dopant may be present at the outer surface of the printed part as well as at at least one location embedded within the printed part. In some examples, the dopant may be present at at least one location embedded within the printed part.

In some examples, the printed part comprises regions comprising the dopant and regions in which the dopant is absent. The regions comprising the dopant may differ in at least one property from the regions in which the dopant is absent, wherein the at least one property is selected from at least one of conductivity, dielectric permittivity, magnetic permeability, refractive index, photoluminescence, tensile strength and Young's modulus.

Build Material

Any suitable build material may be employed in the present disclosure. The build material comprises polymer particles or powder, for example, thermoplastic polymer particles or powder. The particles may have an average particle size from 10 to 100 μm, for example, 20 to 80 μm. As used in the present disclosure, "average" with respect to properties of particles refers to a number average unless otherwise specified. Accordingly, "average particle size" refers to a number average particle size. Additionally, "particle size" refers to the diameter of spherical particles, or to the longest dimension of non-spherical particles. Particle size may be determined by any suitable method, for example, by dynamic laser scattering or laser diffraction spectroscopy. An example of a commercially available instrument suitable for determining particle size may be Mastersizer® by Malvern® Instruments.

In certain examples, the polymer particles can have a variety of shapes, such as substantially spherical particles or irregularly-shaped particles. In some examples, the polymer particles can be capable of being formed into 3D printed parts with a resolution of 10 to 100 μm, for example 20 to 80 μm. As used herein, "resolution" refers to the size of the smallest feature that can be formed on a 3D printed part. The polymer particles can form layers from about 10 to about 100 μm thick, allowing the fused layers of the printed part to have roughly the same thickness. This can provide a resolution in the z-axis direction of about 10 to about 100 μm. The polymer particles can also have a sufficiently small particle size and sufficiently regular particle shape to provide about 10 to 100 μm resolution along the x-axis and y-axis.

In some examples, the polymer particles can be colorless. For example, the polymer powder can have a white, translucent, or transparent appearance. When used, for example, with a colorless fusing composition, such polymer particles can provide a printed part that is white, translucent, or transparent. In other examples, the polymer particles can be colored for producing colored parts. In still other examples, when the polymer powder is white, translucent, or transparent, color can be imparted to the part by a coloured fusing ink or another colored ink.

The polymer particles can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can nylon 6 powder, nylon 9 powder, nylon 11 powder, nylon 12 powder, nylon 66 powder, nylon 612 powder, polyethylene powder, thermoplastic polyurethane powder, polypropylene powder, polyester powder, polycarbonate powder, polyether ketone powder, polyacrylate powder, polystyrene powder, or combinations thereof. In a specific example, the polymer powder can be nylon 12, which can have a melting point from about 175° C. to about 200° C. In another specific example, the polymer powder can be thermoplastic polyurethane.

The polymer particles can also in some cases be blended with a filler. The filler can include inorganic particles such as alumina, silica, or combinations thereof. When the particles fuse together, the filler particles can become embedded in the polymer, forming a composite material. In some examples, the filler can include a free-flow agent, anticaking agent, or the like. Such agents can prevent packing of the powder particles, coat the powder particles and smooth edges to reduce inter-particle friction, and/or absorb moisture. In some examples, a weight ratio of thermoplastic polymer powder to filler particles can be from 10:1 to 1:2 or from 5:1 to 1:1.

Dopant Composition

In the present disclosure, a dopant composition is used to introduce a dopant into the printed part. The dopant composition may be inkjet printed onto a layer of build material prior to fusing. In other words, the dopant composition may be printed onto unfused build material. By inkjet printing the dopant composition, the dopant composition may be printed droplet-by-droplet at specific locations, allowing dopant to be introduced at the voxel-level. Each droplet of dopant composition may have a volume of less than 50 pl, less than 40 pl, less than 30 pl, less than 20 pl, less than 10 pl. In some examples, the droplet size may be 1 to 40 pl, for example, 2, 3, 4 or 5 to 30 pl, for instance, 2, 3, 4 or 5 to 20 pl or 2, 3, 4 or 5 to 10 pl. In some examples, the dopant composition may be applied to unfused build material, for example, prior to application of any fusing composition over the build material.

Once the dopant composition is printed, the layer of build material may be fused at selected areas to a form a fused layer. Fusing may be performed under computer or digital control. These selected areas include areas that have been printed with the dopant composition and areas that are free from the dopant composition. In this way, dopant may be incorporated into the resulting fused layer at pre-determined locations in a pre-determined pattern. This can allow the properties of the printed part to be controlled and varied. For example, by selecting appropriate dopants and tailoring their concentration and/or location at each layer of build material, properties such as electrical conductivity, heat conductivity, magnetic properties, mechanical properties (e.g. tensile strength) or optical properties can be tailored accordingly.

In some examples, fusing may be carried out by applying a fusing composition to selected areas of the layer of build material and subjecting the build material to heat or electromagnetic radiation. The application of heat or electromagnetic radiation may cause the polymer of the build material to melt or soften in the areas where the fusing composition has been applied. The selected areas over which the fusing composition is applied may include areas that are printed with a dopant composition as well as areas that are unprinted or devoid of dopant composition.

The volume of dopant composition that is printed on the particulate build material may be varied. For example, when using a single dopant composition with one concentration of dopant, applying more ink to a given voxel can result in a greater mass fraction of dopant. Increasing mass fraction of dopant can be carried out by ejecting higher drop volumes, ejecting more drops at a given voxel, or by printing multiple passes of fluid at a single voxel location. In another example, multiple dopant compositions can be prepared with different concentrations of dopants. The multiple dopant compositions can likewise be printed at different fluid volumes as well for additional flexibility.

The concentration of dopant throughout the printed part may be varied gradually, for example, to create a concentration gradient of dopant in at least one region of the printed part. As a result, at least one property of the printed part may vary along a gradient. For example, the electrical conductivity, heat conductivity, magnetic properties or optical properties of the part may vary along a gradient in at least one region of the printed part. Alternatively, the dopant may be printed at a fixed concentration such that the concentration of dopant is substantially constant throughout all dopant-printed areas of the printed part.

When the dopant composition is printed onto a layer of the build material, the dopant composition can penetrate into build material. As a result, the dopant (e.g. particles, for instance, nanoparticles) can deposit on particles of the build material and/or deposit in the interstices between polymer particles. At large enough mass fractions, the microscopic physical properties of the doped voxel can be modified. By placing dopants, for example at predetermined concentration or at various concentrations (laterally and/or vertically) at a gradient along the structure being printed, parts having specific physical properties at specific locations can be produced. The concentration (e.g., mass fraction) of the dopant, or the pattern of dopant being printed, or both, can provide unique physical properties. Because these dopants can be printed digitally, they can be printed at any concentration and/or pattern desired to obtain a physical property (e.g. optical, photoluminescent, magnetic, or electrical properties), for instance, at one or more specific locations within the printed part.

In some examples, the dopant composition can include a fusing agent. In other examples, the photoluminescent ink can be printed with a separate fusing composition to facilitate fusing of the thermoplastic polymer. In either case, the temperature of the build material can be raised above the melting or softening point of the thermoplastic polymer so as to facilitate the fusing process.

Any suitable dopant may be employed. In some examples, the dopant takes the form of solid particles, for instance, nanoparticles. These particles may be dispersed in a liquid carrier, for example, in the presence of a surfactant. Suitable particles include photoluminescent particles, dielectric particles, magnetic particles, ceramic particles, semi-conductor particles, and electrically-conducting particles polymer particles.

In some examples, the dopant is a photosensitive dopant. The photosensitive dopant may be a charge transport molecule. Examples of photosensitive dopants include p-diethylaminobenzaldehyde diphenylhydrazone, anti-9-isopropylcarbazole-3-carbal-dehyde diphenylhydrazone or tri-p-tolylamine. When exposed to a predetermined wavelength of electromagnetic radiation, photosensitive dopants undergo an irreversible molecular reconfiguration, which can change the electrical properties of the dopant, for example, by turning them on or off. Where a photosensitive dopant is used, therefore, it may be possible to expose certain regions of the doped build material either in an unfused or fused state to predetermined wavelengths of electromagnetic radiation to turn the electrical properties of the dopant on or off. The predetermined wavelengths of electromagnetic radiation may be applied using a laser operated, for example, under laser control to induce the irreversible molecular reconfiguration in certain regions of the build material.

In some examples, the dopant is not a photosensitive dopant. Thus, in some examples, the dopant is not a charge transport molecule. In some examples, the dopant is not p-diethylaminobenzaldehyde diphenylhydrazone, anti-9-isopropylcarbazole-3-carbal-dehyde diphenylhydrazone or tri-p-tolylamine.

Suitable particles may have a particle size in the range of 1 to 200 nm. Nanoparticles may have a particle size of 1 to 100 nm. In some examples, nanoparticles having a particle size of 1 to 80 nm, for example, 2 to 50 nm or 3 to 20 nm are employed.

The dopant may be present in the dopant composition in an amount of 0.01 wt % to 10 wt %. In one example, the concentration of dopant in the dopant composition can be from 0.05 wt % to 8 wt %. In another example, the concentration can be from 0.1 wt % to 5 wt %. In yet another example, the concentration can be from 0.1 wt % to 3 wt %. In a particular example, the concentration can be from 0.5 wt % to 1.5 wt %.

Where the dopant is a photoluminescent agent, any agent that exhibits photoluminescence may be employed. "Photoluminescence," as used herein, refers to an emission of light by a substance as a result of the absorbance of a photon by that substance. More specifically, absorption of a photon by a photoluminescent agent can induce photoexcitation of the photoluminescent agent. Photoexcitation refers to the excitation of electrons within the photoluminescent agent due to the absorption of the photon. The photoexcitation of the photoluminescent agent can be followed by a relaxation event, where the excited electrons relax back to a lower energy state. The relaxation of the excited electrons can be accompanied by the emission of a photon from the photoluminescent agent. Typically, the photoluminescent agent can absorb photons at a different wavelength of electromagnetic radiation than the wavelength of the emitted photon.

In some examples, these photoluminescent agents can be "tuned" to photoexcite at wavelengths within the Ultraviolet (UV) range and to photoluminesce within the visible range. This can allow the photoluminescent agent to remain covert until irradiated with a photoexciting wavelength of electromagnetic radiation. In other examples, the photoluminescent agent can be "tuned" to photoexcite at one wavelength within the visible range and to emit at a different wavelength within the visible range.

Non-limiting examples of photoluminescent agents can include a photoluminescent pigment, a photoluminescent dye, a quantum dot, the like, or combinations thereof. In some examples, the photoluminescent agent can include a fluorescent agent, a phosphorescent agent, or a combination thereof. In some examples, photoluminescent dyes can be enclosed within, distributed throughout, or otherwise associated with a particle (e.g. nanoparticle). In some examples, photoluminescent pigments can include a photoluminescent particle (e.g. nanoparticle). For example, a photoluminescent pigment or dye can be coupled to a surface of a particle (e.g. nanoparticle), embedded within the particle (e.g. nanoparticle), distributed throughout the particle (e.g. nanoparticle), or otherwise associated with a particle (e.g. nanoparticle).

Numerous photoluminescent pigments and/or dyes can be used. Non-limiting examples can include europium doped strontium aluminates, thallium doped sodium iodides, activated alkaline earth metal sulfides, activated alkaline earth metal silicates, rhodamines, acridines, fluorines, cyanines, oxazines, phenanthridines, pyrrolopyrroles, benzoxazoles, benzothiazoles, azo pigments, azo-metal complexes, bisacetoacetarylides, azomethines, arylmethines, benzimidazolones, diazopyrazolones, quinacridones, quinones, flavanthrones, perinones, isoindolines, isoindolinones, perylenes, phthalocyanines, metal-phthalocyanine complexes, porphyrins, metal-porphyrin complexes, polyenes, polymethines, squaraines, or combinations thereof. In one specific example, a photoluminescent dye can be fluorescein. In another specific example, a photoluminescent dye can be rhodamine B. As previously described, dyes or pigments can be associated with nanoparticles. Non-limiting commercially available examples can include Fluoresbrite® microspheres, such as YG Carboxylate Microspheres, YO Carboxylate Microspheres, NYO Carboxylate Microspheres, BB Carboxylate Microspheres, and EU Carboxylate Microspheres available from Polysciences, Inc.

Where the photoluminescent agent is a particulate (e.g., a photoluminescent pigment, photoluminescent nanoparticle, etc.), the photoluminescent agent can have a particle size from about 10 nm to about 400 nm or 500 nm, or from about 20 nm to about 200 nm or 300 nm, or from about 30 nm to about 70 nm or 120 nm.

Quantum dots can also be used as a photoluminescent agent. Quantum dots can be very small semiconductor particles that typically have a particle size of about 20 nm or less. Quantum dots can be made of a variety of semiconductor materials. For example, quantum dots can be made of a single element, such as silicon, germanium, and the like. Alternatively, quantum dots can be compounds of materials, such as indium phosphide, indium arsenide, zinc sulfide, lead sulfide, cadmium sulfide, lead selenide, cadmium selenide, the like, or combinations thereof. Other quantum dots that can be used include quantum dots, including, for example $CuInS_x$ or $CuInSe_x$ quantum dots, where x may be 1 or 2. Non-limiting commercially available quantum dots can include Indium Phosphide Zinc Sulfide Quantum Dots in Water and Cadmium Selenide Zinc Sulfide Quantum Dots in Water from NN-Labs, and NanoDOT™ CIS-500 and NanoDOT™ CIS-700 from Voxtel, Inc.

Quantum dots can be prepared in a number of ways. For example, the quantum dots can be made of a single component with uniform composition throughout (e.g., silicone, zinc sulfide, etc.). The photoluminescence of these quantum dots can be tunable merely by adjusting the size of the quantum dot. In other examples, the quantum dots can be prepared with a core material having a lower band gap surrounded by a shell material having a higher band gap. As one example, the core material can be cadmium selenide and the shell material can be zinc sulfide. The photoluminescence of these quantum dots can be tunable based on both particle size and the specific combination of core and/or shell materials. In other examples, the quantum dots can be prepared by alloying different quantum dots particles together, such as indium phosphide and zinc sulfide, or cadmium selenide and zinc sulfide, or any other suitable alloy of quantum dot particles. These quantum dots can also be tuned based on both size and the specific semiconductor used.

As previously described, quantum dots can typically have a particle size of about 20 nm or less. Generally, the larger the particle size of the quantum dot, the longer the photoluminescent emission wavelength will be. Conversely, the smaller the particle size of the quantum dot, the shorter the photoluminescent emission wavelength will be. In some examples, the quantum dots can have a particle size from about 2 nm to about 10 nm. In other examples, the quantum dots can have a particle size from about 4 nm to about 8 nm. In other examples, the quantum dots can have a particle size from about 8 nm to about 14 nm.

In some examples, the dopants are dielectric particles (e.g. nanoparticles). Dielectric particles may be used to alter the dielectric properties (e.g. capacitance) of a printed part at pre-determined locations. Because of the physical relationship between a material's dielectric constant and its refractive index, the optical properties (e.g. refractive index) of a printed part may be varied by incorporating dielectric nanoparticles into the printed part at specific locations. Thus, by printing dielectric particles at specific locations, the local refractive index of each voxel can be varied. This may have applicability in lens manufacture. For example, droplets of dopant composition comprising dielectric particles can be printed at the voxel level on a layer of polymer build material, and then the layer can be fused, thus forming a lens layer. This lens layer can be built upon to form a lens or a lens stack with optical spacers. By changing the density of dielectric particles locally at the voxel level, the refractive index at various locations can also be changed. In other words, dielectric particles can be printed at the voxel level to predictably shift the effective dielectric constant of a polymer build material by controlling the mass fraction of dielectric particles per voxel. A gradient refractive index (GRIN) lens may be formed by varying the effective refractive index (using different concentrations of dielectric particles) within each layer as appropriate to form the GRIN lens. Lenses or lens stacks can be prepared by additive layering until a desired optical structure is formed. For optical (e.g. lens) applications, the build material may be formed of transparent polymer particles.

Example dielectric particles that can be used include, but are not limited to, $BaTiO_3$, PMN-PT (e.g., 65/35), $PbNb_2O_6$, PLZT (e.g., 7/60/40), $SiO_2$, $Al_2O_3$, $Ta_2O_5$, $TiO_2$, $SrTiO_3$, $ZrO_2$, $HfO_2$, $HfSiO_4$, $La_2O_3$, $Y_2O_3$, $\alpha$-$LaAlO_3$, $CaCu_3Ti_4O_{12}$, and/or $La_{1.8}Sr_{0.2}NiO_4$, to name a few. The particle size of the dielectric particles may be, for example from 1 nm to 100 nm, or from 1 nm to 50 nm, or from 5 nm to 30 nm, or from 20 nm to 100 nm, or from 50 nm to 100 nm in average particle size.

The dopant composition may comprise a liquid vehicle. In some examples, the liquid vehicle formulation can include water or consist of water.

In some examples, an additional co-solvent may also be present. In certain examples, a high boiling point co-solvent can be included in the dopant composition. The high boiling point co-solvent can be an organic co-solvent that boils at a temperature higher than the temperature of the powder bed during printing. In some examples, the high boiling point co-solvent can have a boiling point above 250° C. In still further examples, the high boiling point co-solvent can be present at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

A surfactant, or combination of surfactants, can also be present in the dopant composition. Examples of surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0.01 wt % to 20 wt %. Suitable surfactants can include, but are not limited to, liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; and sodium dodecylsulfate.

Various other additives can be employed to optimize the properties of the dopant compositions for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities. Buffers may also be used to control the pH of the composition. Viscosity modifiers may also be present. Such additives can be present at from 0.01 wt % to 20 wt %.

Fusing Composition

Where a fusing composition is employed, the fusing composition (or "fusing ink") can contain a fusing agent that is capable of absorbing electromagnetic radiation to produce heat. The fusing agent can be colored or colorless. In some examples, the fusing agent can be carbon black, near-infrared absorbing dyes, near-infrared absorbing pigments, tungsten bronzes, molybdenum bronzes, metal nanoparticles, or combinations thereof.

The fusing composition may be inkjet printed onto selected areas of the layer of build material prior to fusing. The fusing composition may be applied to areas of the layer of build material that have been printed with dopant composition, as well as to areas of the layer of build material that have not been printed with dopant composition. The fusing agent can have a temperature boosting capacity sufficient to increase the temperature of the polymer powder above the melting or softening point of the polymer powder. When the fusing ink is printed on a portion of the polymer powder, the fusing agent can heat the printed portion to a temperature at or above the melting or softening point, while the portions of the polymer powder unprinted with fusing ink remain below the melting or softening point. This can allow the formation of a solid 3D printed part, while the loose powder can be easily separated from the finished printed part. Any dopant printed on the polymer powder prior to application of the fusing composition may also become incorporated into the printed part.

The fusing agent may be an infrared absorbing, for example, a near-infrared absorbing dye. Examples of near-infrared absorbing dyes include tetraaryldiamine dyes, cyanine dyes, pthalocyanine dyes, dithiolene dyes, and others. In further examples, the fusing agent can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the fusing agent can have a peak absorption wavelength in the range of 800 nm to 1400 nm.

The fusing agent may also be an infrared absorbing, for example, a near-infrared absorbing pigment. A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional examples of near-infrared pigments can include silicates. The silicates can have the same or similar counterions as the phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

The amount of fusing agent in the fusing composition can vary depending on the type of fusing agent. In some examples, the concentration of fusing agent in the fusing composition can be from 0.1 wt % to 20 wt %. In one example, the concentration of fusing agent in the fusing ink can be from 0.1 wt % to 15 wt %. In another example, the concentration can be from 0.1 wt % to 8 wt %. In yet another example, the concentration can be from 0.5 wt % to 2 wt %. In a particular example, the concentration can be from 0.5 wt % to 1.2 wt %.

In some examples, the fusing ink can have a black or gray color due to the use of carbon black as the fusing agent. However, in other examples the fusing ink can be colorless or nearly colorless. The concentration of the fusing agent can be adjusted to provide a fusing ink in which the visible color of the fusing ink is not substantially altered by the fusing agent. Although some of the above described fusing agents can have low absorbance in the visible light range, the absorbance is usually greater than zero. Therefore, the fusing agents can typically absorb some visible light, but their color in the visible spectrum can be minimal enough that it does not substantially impact the fusing composition's ability to take on another color when a colorant is added. The fusing agents in concentrated form can have a visible color, but the concentration of the fusing agents in the fusing ink can be adjusted so that the fusing agents may not be present in such high amounts that they alter the visible color of the fusing ink. For example, a fusing agent with a very low absorbance of visible light wavelengths can be included in greater concentrations compared to a fusing agent with a relatively higher absorbance of visible light. These concentrations can be adjusted based on a specific application with some experimentation.

In further examples, the concentration of the fusing agent can be high enough that the fusing agent impacts the color of the fusing ink, but low enough that when the ink is printed on the build material comprising the polymer particles or powder, the fusing agent does not impact the color of the powder. The concentration of the fusing agent can be balanced with the amount of fusing ink to be printed on the polymer powder so that the total amount of fusing agent printed onto the polymer powder can be low enough that the visible color of the polymer powder is not impacted. In one example, the fusing agent can have a concentration in the fusing ink such that after the fusing ink is printed onto the polymer powder, the amount of fusing agent in the polymer powder is from 0.0003 wt % to 5 wt % with respect to the weight of the polymer powder.

The fusing agent can have a temperature boosting capacity sufficient to increase the temperature of the polymer powder above the melting or softening point of the polymer powder. As used herein, "temperature boosting capacity" refers to the ability of a fusing agent to convert electromagnetic radiation e.g. infrared or near-infrared light energy into thermal energy to increase the temperature of the printed polymer powder over and above the temperature of the unprinted portion of the polymer powder. Typically, the polymer powder particles can be fused together when the temperature increases to the melting or softening temperature of the polymer. As used herein, "melting point" refers to the temperature at which a polymer transitions from a crystalline phase to a pliable, amorphous phase. Some polymers do not have a single melting point, but rather have a range of temperatures over which the polymers soften. This range can be segregated into a lower softening range, a middle softening range, and an upper softening range. In the lower and middle softening ranges, the particles can coalesce to form a part while the remaining polymer powder remains loose. If the upper softening range is used, the whole powder bed can become a cake. The "softening point," as used herein, refers to the temperature at which the polymer particles coalesce while the remaining powder remains separate and loose. When the fusing ink is printed on a portion of the polymer powder, the fusing agent can heat the printed portion to a temperature at or above the melting or softening point, while the unprinted portions of the polymer powder remain below the melting or softening point. This allows the formation of a solid 3D printed part, while the loose powder can be easily separated from the finished printed part.

Although melting point and softening point are often described as the temperatures for coalescing the polymer powder, in some cases the polymer particles can coalesce together at temperatures slightly below the melting point or softening point. Therefore, as used herein "melting point" and "softening point" can include temperatures slightly lower, such as up to about 20° C. lower, than the actual melting point or softening point.

In one example, the fusing agent can have a temperature boosting capacity from about 10° C. to about 70° C. for a polymer with a melting or softening point from about 100° C. to about 350° C. If the powder bed is at a temperature within about 10° C. to about 70° C. of the melting or softening point, then such a fusing agent can boost the temperature of the printed powder up to the melting or softening point, while the unprinted powder remains at a lower temperature. In some examples, the powder bed can be preheated to a temperature from about 10° C. to about 70° C. lower than the melting or softening point of the polymer. The fusing composition can then be printed onto the powder and the powder bed can be irradiated with a near-infrared light to coalesce the printed portion of the powder.

The fusing composition may comprise a liquid vehicle. The fusing agent may be dispersed in the liquid vehicle. In some examples, the liquid vehicle formulation can include water or consist of water.

In some examples, an additional co-solvent may also be present. In certain examples, a high boiling point co-solvent can be included in the fusing composition. The high boiling point co-solvent can be an organic co-solvent that boils at a temperature higher than the temperature of the powder bed during printing. In some examples, the high boiling point co-solvent can have a boiling point above 250° C. In still further examples, the high boiling point co-solvent can be present at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

A surfactant, or combination of surfactants, can also be present in the fusing composition. Examples of surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0.01 wt % to 20 wt %. Suitable surfactants can include, but are not limited to, liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; and sodium dodecylsulfate.

Various other additives can be employed to optimize the properties of the fusing compositions for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities. Buffers may also be used to control the pH of the composition. Viscosity modifiers may also be present. Such additives can be present at from 0.01 wt % to 20 wt %.

Colorant

In addition to dopant, colorant may be applied to the build material. Colorant may be applied to at least the outer surface of the printed part. The colorant may be visible to the naked eye and may be employed in sufficient amounts to impart a discernible colour to the printed part. The colorant may be a visible dye or a visible pigment.

Such colorants may be applied by printing an inkjet ink composition comprising a colorant onto the build material. The colored inkjet ink may be applied to at least portions of a layer of unfused polymer particles to impart colour to the printed part. A colored ink jet ink can include any suitable colorant, including dyes and/or pigments. This can allow for printing of full-color 3-dimensional parts. Suitable inkjet inks include cyan, magenta, yellow, and black inks. Coloured inkjet ink compositions may be provided together with the build material, dopant composition and fusing composition as part of the 3-dimensional printing material set.

Alternatively or additionally, colorants may be incorporated into the dopant composition and/or fusing composition described above. In some examples, the colorant can be present in an amount from 0.5 wt % to 10 wt % in the compositions. In one example, the colorant can be present in an amount from 1 wt % to 5 wt %. In another example, the colorant can be present in an amount from 5 wt % to 10 wt %.

In some examples, the colorant can be a dye. The dye may be nonionic, cationic, anionic, or a mixture of nonionic, cationic, and/or anionic dyes. Specific examples of dyes that may be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include Orasol® Blue GN, Orasol® Pink, and Orasol® Yellow dyes available from Ciba-Geigy Corp. Black dyes may include, but are not limited to, Direct Black 154, Direct Black 168, Fast Black 2, Direct Black 171, Direct Black 19, Acid Black 1, Acid Black 191, Mobay Black SP, and Acid Black 2.

In other examples, the colorant can be a pigment. The pigment can be self-dispersed with a polymer, oligomer, or small molecule; or can be dispersed with a separate dispersant. Suitable pigments include, but are not limited to, the following pigments available from BASF: Paliogen®) Orange, Heliogen® Blue L 6901F, Heliogen®) Blue NBD 7010, Heliogen® Blue K 7090, Heliogen® Blue L 7101F, Paliogen®) Blue L 6470, Heliogen®) Green K 8683, and Heliogen® Green L 9140. The following black pigments are available from Cabot: Monarch® 1400, Monarch® 1300, Monarch®) 1100, Monarch® 1000, Monarch®) 900, Monarch® 880, Monarch® 800, and Monarch®) 700. The following pigments are available from CIBA: Chromophtal®) Yellow 3G, Chromophtal®) Yellow GR, Chromophtal®) Yellow 8G, Igrazin® Yellow SGT, Igralite® Rubine 4BL, Monastral® Magenta, Monastral® Scarlet, Monastral® Violet R, Monastral® Red B, and Monastral® Violet Maroon B. The following pigments are available from Degussa: Printex® U, Printex® V, Printex® 140U, Printex® 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: Tipure®) R-101. The following pigments are available from Heubach: Dalamar® Yellow YT-858-D and Heucophthal Blue G XBT-583D. The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, and L75-2577 Yellow. The following pigments are available from Columbian: Raven® 7000, Raven® 5750, Raven® 5250, Raven® 5000, and Raven® 3500. The following pigment is available from Sun Chemical: LHD9303 Black. Any other pigment and/or dye can be used that is useful in modifying the color of the above described inks and/or ultimately, the printed part.

Printing System

The method of the present disclosure may be performed using a 3-dimensional printing system. An example of a 3-dimensional printing system 100 is shown in FIG. 1. The system may include a powder bed 110 including build material in the form of, for example, a thermoplastic polymer powder 115. In the example shown, the powder bed has a moveable floor 120 that allows the powder bed to be lowered after each layer of the 3-dimensional part is printed. The 3-dimensional printed part can include a doped layer 126, including a doped portion 125, applied to a surface of a part body 127. The system also includes an inkjet printer 130 that includes a first inkjet pen 135 in communication with a reservoir of a dopant ink 140. The first inkjet pen can print the dopant ink onto the powder bed. A second inkjet pen 145 is in communication with a reservoir of a fusing ink 150. The second inkjet pen can print the fusing ink onto the powder bed. After the fusing ink has been printed onto the powder bed, a fusing lamp 160 can be used to expose the powder bed to electromagnetic radiation sufficient to fuse the powder that has been printed with the fusing inks.

To achieve good selectivity between the fused and unfused portions of the powder bed, the fusing inks can absorb enough energy to boost the temperature of the e.g. thermoplastic polymer powder above the melting or softening point of the polymer, while unprinted portions of the powder bed remain below the melting or softening point. In some examples, the 3-dimensional printing system can include preheaters for preheating the thermoplastic polymer powder to a temperature near the melting or softening point. In one example, the system can include a print bed heater to heat the print bed during printing. The preheat temperature used can depend on the type of thermoplastic polymer used. In some examples, the print bed heater can heat the print bed to a temperature from 130° C. to 160° C. The system can also include a supply bed, where polymer particles can be stored before being spread in a layer onto the print bed. The supply bed can have a supply bed heater. In some examples, the supply bed heater can heat the supply bed to a temperature from 90° C. to 140° C.

Suitable fusing lamps for use in the 3-dimensional printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to coalesce each printed layer. The fusing lamp can irradiate the entire powder bed with a substantially uniform amount of energy. This can selectively coalesce the printed portions with fusing inks leaving the unprinted portions of the polymer powder below the melting or softening point.

In one example, the fusing lamp can be matched with the fusing agents in the fusing inks so that the fusing lamp emits wavelengths of light that match the peak absorption wavelengths of the fusing agents. A fusing agent with a narrow peak e.g. at a particular near-infrared wavelength can be used with a fusing lamp that emits a narrow range of wavelengths at approximately the peak wavelength of the fusing agent. Similarly, a fusing agent that absorbs e.g. a broad range of near-infrared wavelengths can be used with a fusing lamp that emits a broad range of wavelengths. Matching the fusing agent and the fusing lamp in this way can increase the efficiency of coalescing the polymer particles with the fusing agent printed thereon, while the unprinted polymer particles do not absorb as much light and remain at a lower temperature.

Depending on the amount of fusing agent present, the absorbance of the fusing agent, the preheat temperature, and the melting or softening point of the polymer, an appropriate amount of irradiation can be supplied from the fusing lamp. In some examples, the fusing lamp can irradiate each layer from about 0.5 to about 10 seconds per pass.

Figure 2:
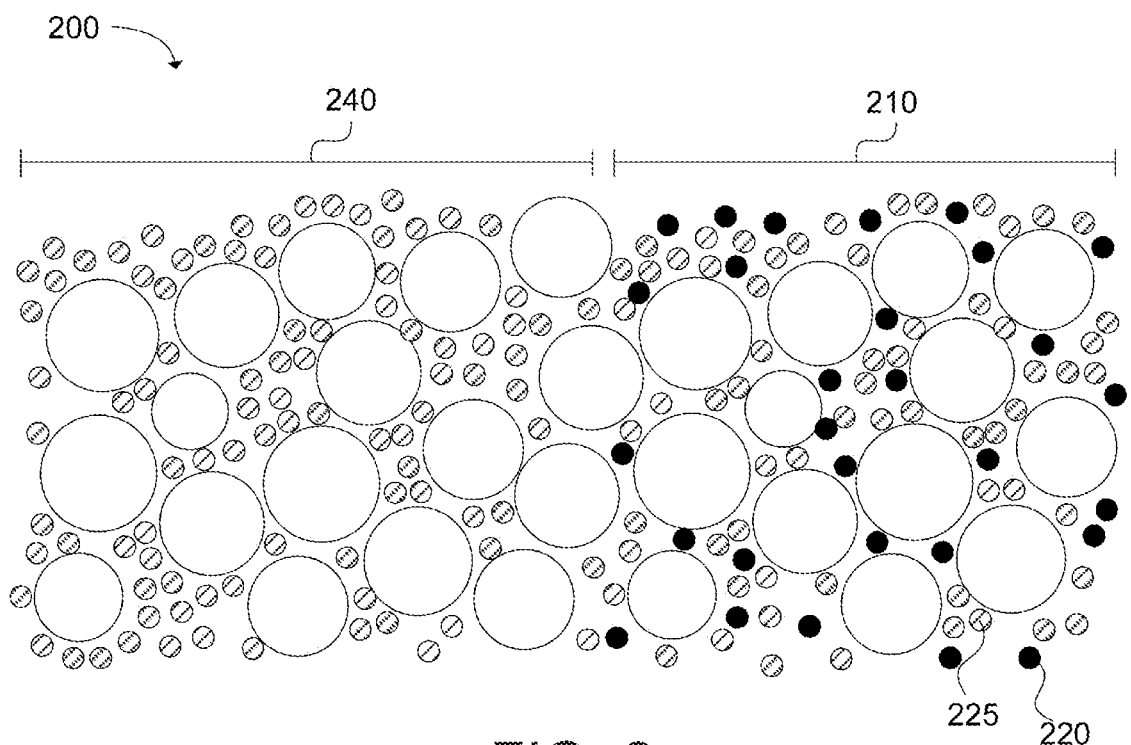
FIG. 2 is a cross-sectional view of a layer of thermoplastic polymer powder with a dopant printed on a portion of the layer in accordance with examples of the present disclosure.
Figure 3:
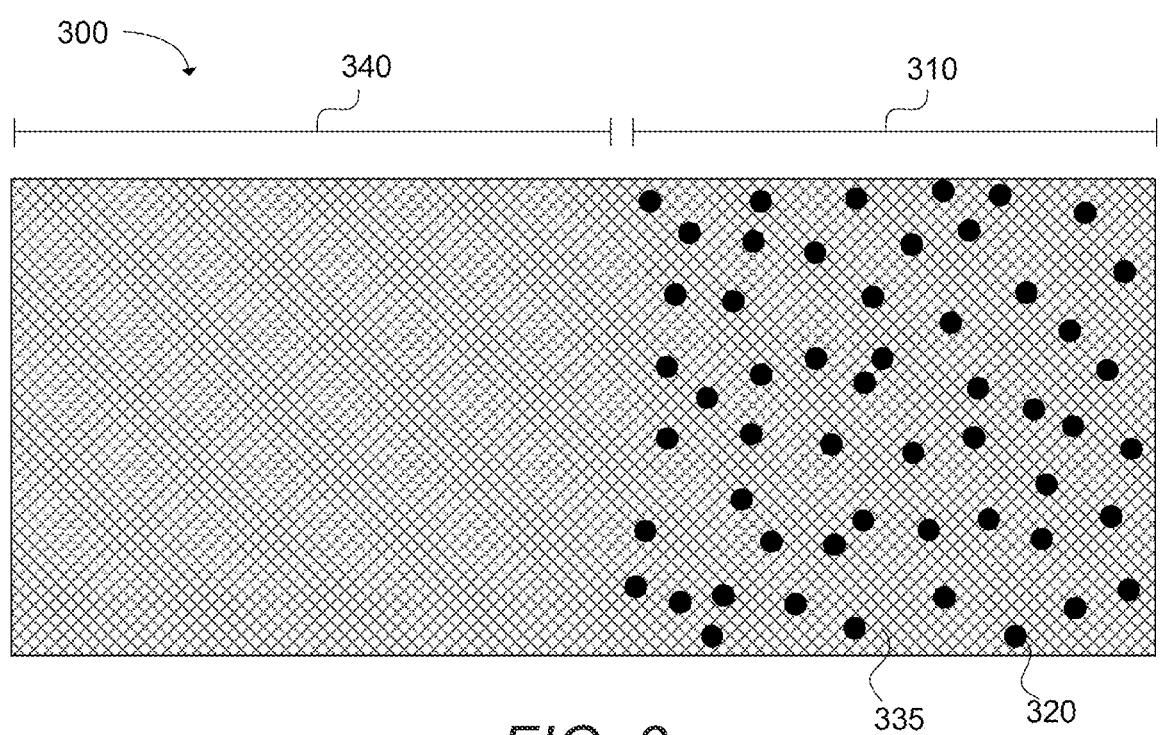
FIG. 3 is cross-sectional view of the layer of FIG. 2 after the layer has been fused in accordance with examples of the present disclosure.

The incorporation of dopant into a 3-dimensional printed part described herein is illustrated, by way of example, in FIGS. 2-3. FIGS. 2-3 are cross sectional views of a layer of polymer powder build material that has been printed with a dopant composition and a fusing composition. FIG. 2 shows the powder layer 200 after being printed but before being cured, and FIG. 3 shows the coalesced powder layer 300 after being cured. In FIG. 2, a first portion 210 of the powder layer 200 has been printed with a dopant composition containing dopant 220 and with fusing ink containing fusing agent 225. The dopant 220 penetrates into the spaces between the powder particles 230. A second portion 240 of the powder layer has been printed with a fusing ink including a fusing agent 225, but without dopant 220. Thus, as shown, only a portion of the printed layer includes the dopant 220. It should be noted that these figures are not necessarily drawn to scale, and the relative sizes of powder particles and dopant particles can differ from those shown.

As shown in FIG. 3, when the powder layer 300 is fused or cured by exposure to electromagnetic radiation, the dispersed dopant 320 can be entrapped throughout a portion of a matrix 335 formed by fusing agent in the ink and the powder particles in the first portion 310. Thus, the dopant entrapped in the matrix of fused polymer powder can form a doped composite layer. In the second portion 340 of the powder layer, the powder particles are fused in the absence of dopant. It should be noted that FIGS. 2 and 3 show only a 2-dimensional cross-section of a portion of a doped composite layer. Further, the dopant is illustrated in FIGS. 2 and 3 as completely penetrating the layer of polymer build material. However, this is not necessary. In some examples, the dopant can extend into the composite layer to a depth greater than about 20%, about 50%, about 70%, or about 90% of the thickness of the layer.

In some examples, the amount of dopant dispensed onto the powder bed can be adjusted by printing the dopant composition in multiple passes. In one example, a single pass of an inkjet printhead can be sufficient. Alternatively, additional passes can be applied to increase the amount of dopant applied. In further examples, the amount of dopant dispensed can be adjusted by adjusting the drop weight of the inkjet printhead either through resistor design or by changing firing parameters. Thus, with a greater drop weight, a greater amount of the dopant can be printed with each drop fired. However, in some cases jetting too large an amount of ink in a single pass can lead to lower print quality because of ink spreading. Therefore, in some examples multiple passes can be used to print more of the photoluminescent ink with better print quality.

Figure 4:
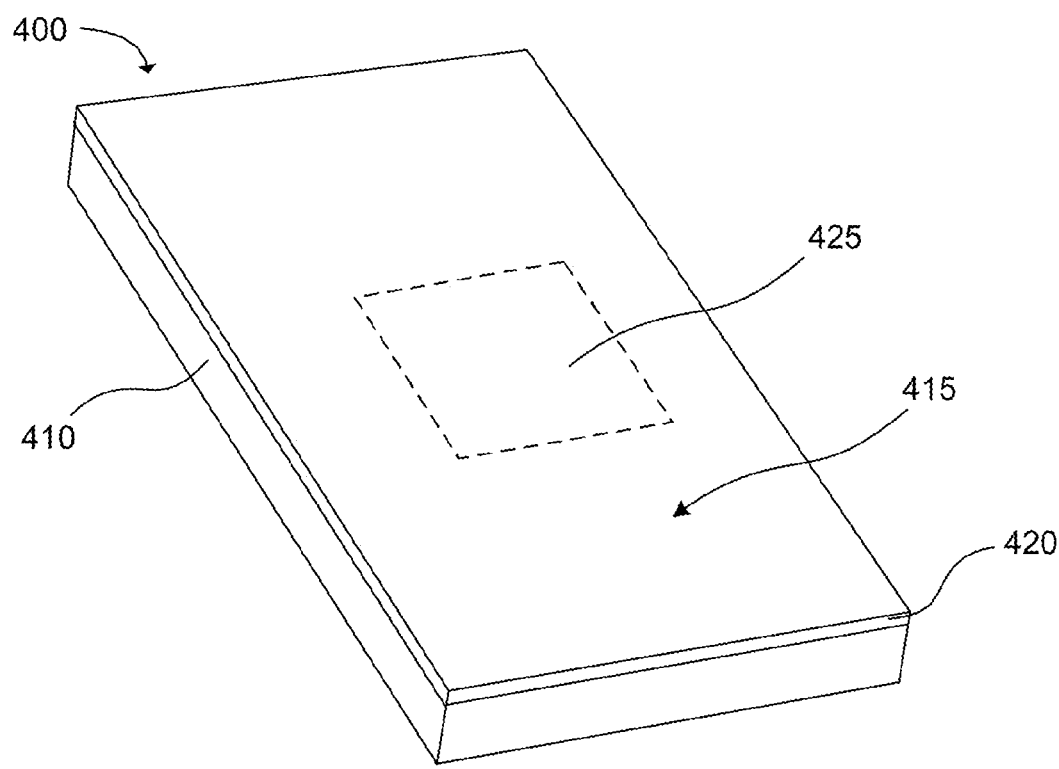
FIG. 4 is a perspective view of a 3-dimensional printed part having a dopant composite layer, in accordance with examples of the present disclosure.

FIG. 4 shows an example of a 3-dimensional printed part 400 that includes a part body 410 and a doped/dopant composite layer 420 applied to a surface of the part body. The dopant composite layer includes a dopant composite portion 425 having a dopant (e.g. photoluminescent agent) dispersed in a matrix of fused thermoplastic polymer powder. It is noted that the dopant can be present both beneath the surface 415 and at the surface of the dopant composite layer. It is also noted that the illustrated 3-dimensional printed part can be printed in a number of orientations, such as with the doped composite portion facing up, facing sideways, etc.

Figure 5:
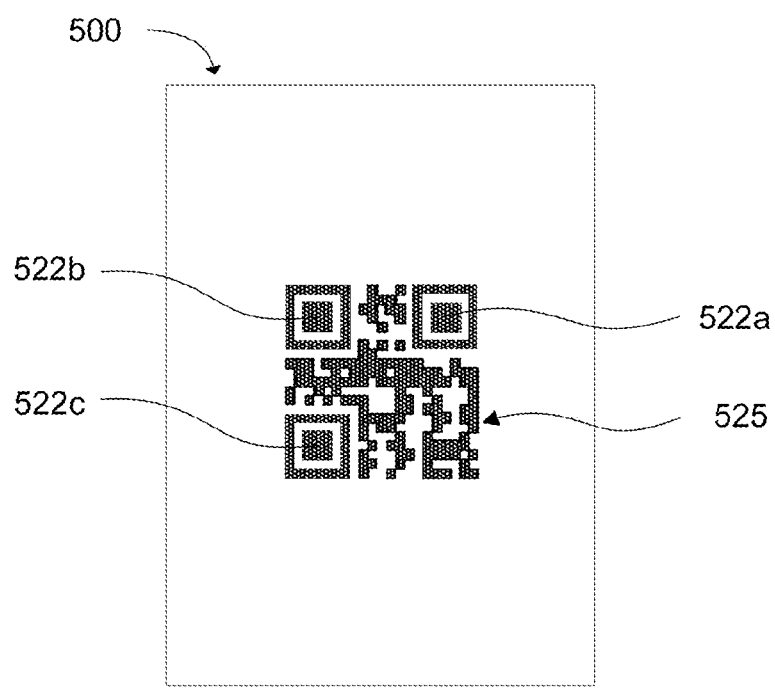
FIG. 5 is a plan view of the 3-dimensional printed part of FIG. 4 where the dopant composite layer is a photoluminescent composite layer in a photoluminescent state, in accordance with examples of the present disclosure.

However, as illustrated in FIG. 5, the dopant (e.g. photoluminescent) composite portion 525 of 3-dimensional printed part 500 can be clearly distinguished from non-doped (e.g. non-photoluminescent portions) of the dopant (e.g. photoluminescent) composite layer. In one example, the dopant composite portion is a photoluminescent composite portion that photoluminesces after photoexcitation to reveal a quick response or QR code. In alternative examples, the dopant composite portion may be a photoluminescent composite portion that can photoluminesce to present a bar code, a serial number, a trademark, a tradename, instructions, other words, the like, or a combination thereof.

In an alternative example, the 3-dimensional printed part 500 can be printed such that the QR code can be clearly visible under ambient lighting and can be decoded using standard QR code algorithms. However, features 522a, 522b, and 522c can each be printed to have different dopant e.g. photoluminescent features. For example, these features can be printed with photoluminescent agents that photoexcite at different wavelengths of electromagnetic radiation, with different amounts of photoluminescent agent to provide different photoluminescent intensities, with different mixtures of photoluminescent agents, etc., or a combination thereof. This can provide additional information encoded in the spatial attributes of the luminescent composite that can only be readable during specific photoluminescent events. Thus, these QR codes can be read using standard QR code algorithms under ambient lighting, but can be read using a specific QR code algorithm during photoluminescence to provide additional information. The same concept can also be employed with bar codes and other identifying or serialization information. Thus, photoluminescent inks can provide increased information payloads for printed security and serialization features.

Figure 6:
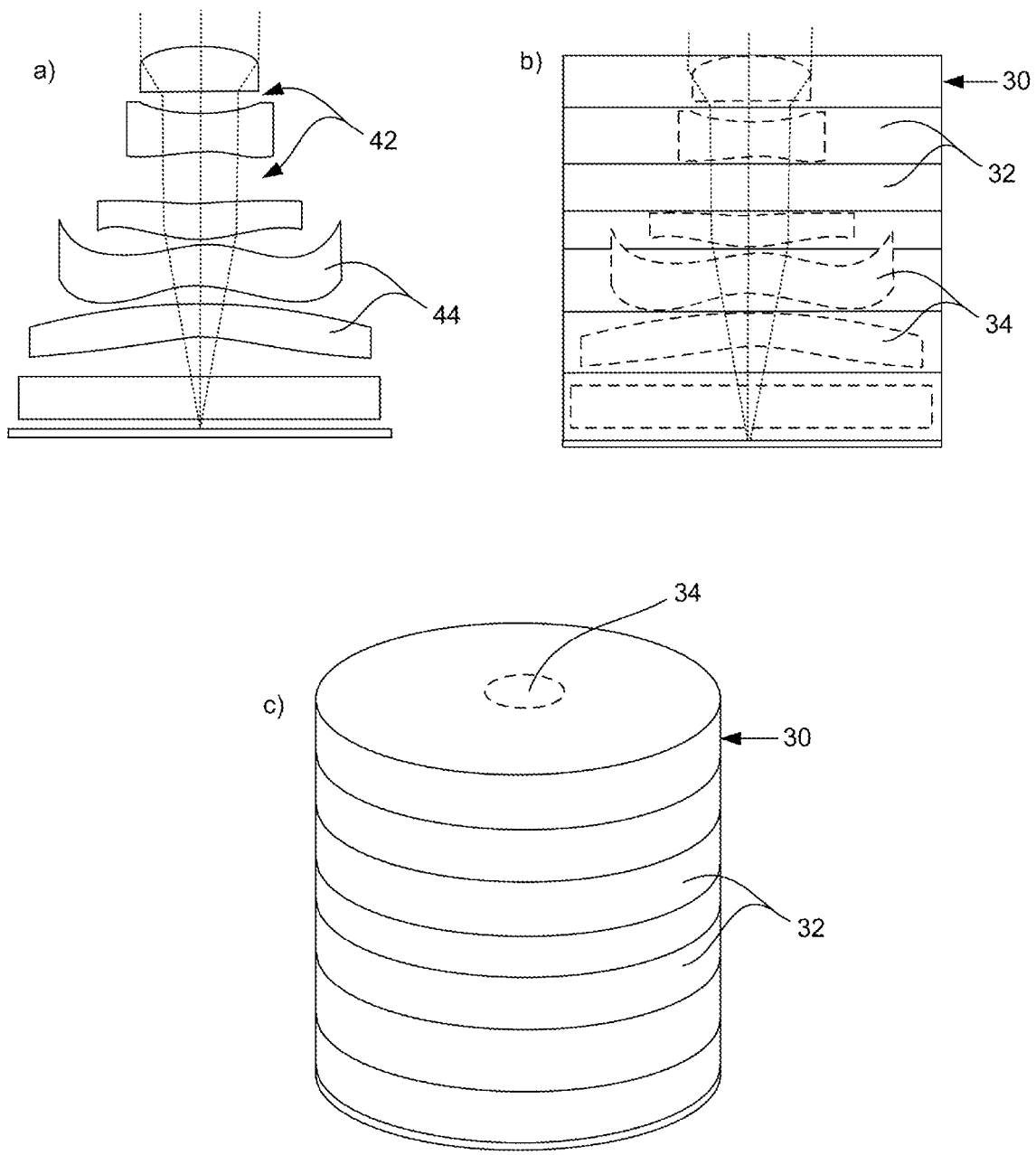
FIG. 6 is an example schematic representation of a GRIN lens stack or assembly that can be prepared in accordance with examples of the present disclosure.

FIG. 6 illustrates schematically a GRIN lens stack or assembly that can be prepared in accordance with examples of the present disclosure. For example, a traditional lens assembly is shown at a) that includes various types of traditional glass lenses 44, including converging lenses, diverging lenses, and optical spacers, etc. Also shown is air space 42 between each lens on the assembly, which is typical of curved lens assemblies where spatial relationships and curvature profiles provide desired optical properties. On the other hand, in accordance with the present disclosure, a GRIN lens stack or assembly is shown at b) which can simulate the optical properties of the more traditional lens stack shown at a). However, the layered and printed lenses are printed to form a monolithic lens structure, as shown at c). Essentially, each of the optical lens shapes shown at a) may be recreated by printing layers 30 (shown thicker than may be applicable in practice) with dielectric nanoparticles as the dopant. The dielectric nanoparticles are printed at varying densities within each layer to form doped lenslets 34 and undoped portions 32. Additionally, rather than having air space between the lenses, spacers can be printed without dielectric nanoparticles, for example (note that there is space between the various lenses). In the schematic structure shown at b) and c), the "lenses" are shown using dashed lines to denote that these GRIN lenses are printed to behave functionally like their counterpart lenses shown at a), but may not actually have the same physical shape as the curved lens. Similar optic characteristics can be achieved by printing varying densities in a gradient along the x-axis, as shown schematically at b).

Advantages of printing GRIN lenses using this method may include the elimination of lens placement, mechanical alignment and assembly costs, since the assembly may be printed as a single monolithic part. Optical fidelity may also be improved because there would be lower error related to precise lens placement. Furthermore, voxel-scale correction of edge aberration defects can be likewise reduced. Because these lenses can be printed digitally, customization and rapid design changes can be carried out without the fabrication of new molds. Furthermore, this technology can be extended into more complex optical systems and sensors, e.g., embedded spectrometers.

Figure 7:
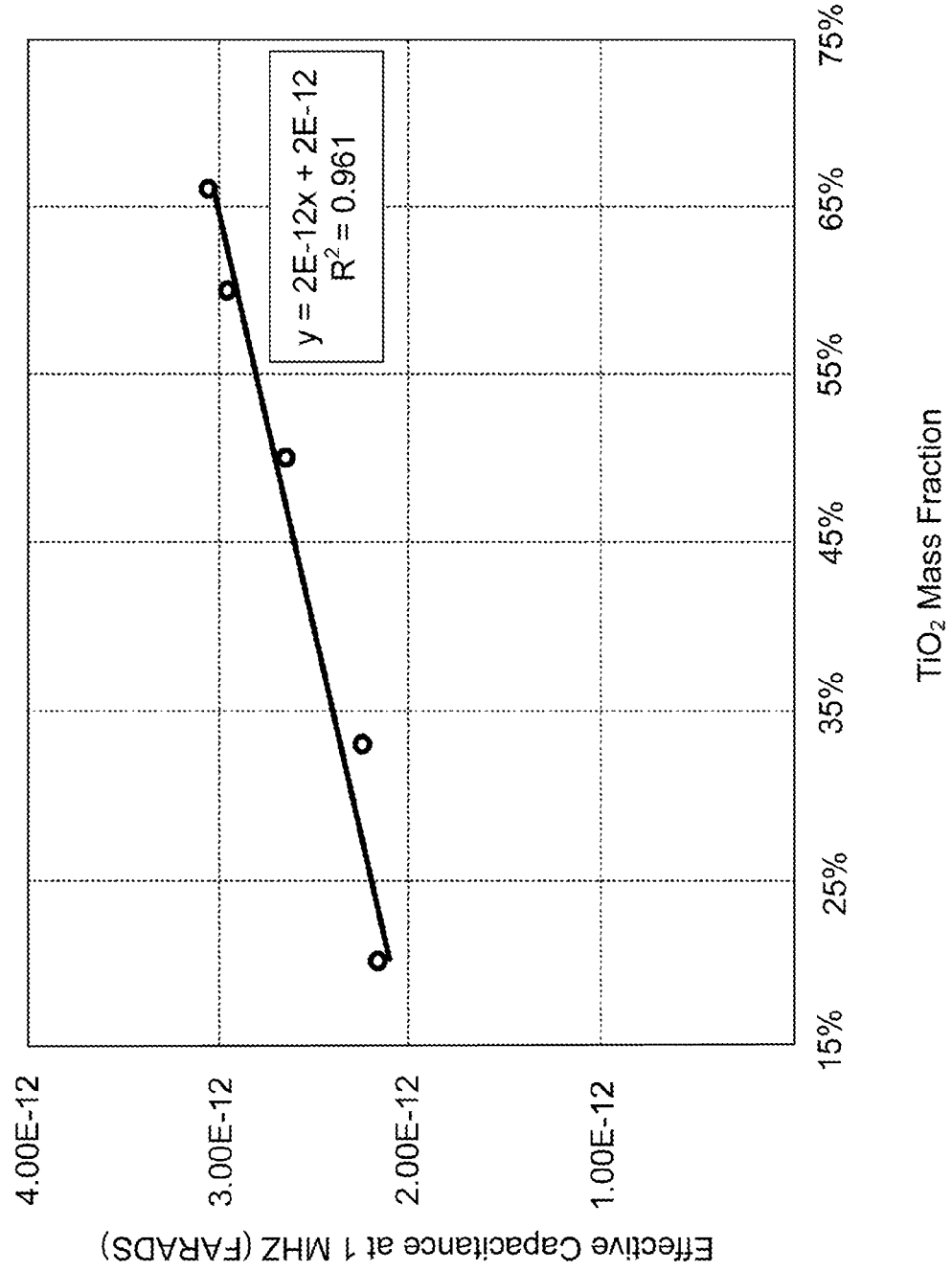
FIG. 7 provides an example depicting effective capacitance increase, and effective refractive index increase, based on increasing concentration or number density of dielectric nanoparticles printed accordance with the present disclosure.

FIG. 7 provides an example of how the effective capacitance ($C = e_0 e_r A/d$) may increase with an increasing concentration or mass fraction of dielectric nanoparticles with respect to the particulate build material. In this equation, C is effective capacitance, $e_0$ is permittivity of vacuum (a fundamental physical constant), $e_r$ is relative dielectric constant (a physical property of the material), A is the capacitor's area, and d is the capacitor's thickness. Notably, in this example, a polyamide 12 (PA-12) powder was used with $TiO_2$ dielectric nanoparticles. PA-12 was used in this example to show that there is a relationship between dielectric nanoparticle number density and effective capacitance (and thus, effective refractive index). In alternative examples, materials e.g. polymethyl methacrylate or polycarbonate or other optically transparent or translucent polymers may be used in place of PA-12. By modifying the number density of $TiO_2$ dielectric nanoparticles in the build material, the effective capacitance can be varied, as shown (by way of example) in FIG. 7. These data were determined by measuring (at 1 MHz) the complex impedance as a function of frequency. As can be seen from FIG. 7, the slope indicates a clear dependence of the effective capacitance on $TiO_2$ mass fraction (or concentration of dielectric nanoparticles).

EXAMPLES

The following illustrates several examples of the present disclosure. However, it is to be understood that the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1

A 3-dimensional printing system was used to print a 3-dimensional printed part having a photoluminescent composite layer on a surface of the part body. A photoluminescent ink (as dopant composition) and fusing ink were printed from two separate ink jet pens. Two separate photoluminescent inks were used. The first photoluminescent ink included 3 wt % fluorescein in an aqueous ink vehicle and the second photoluminescent ink included 0.25 wt % rhodamine B in an aqueous ink vehicle. The fusing ink included 5 wt % carbon black in an aqueous ink vehicle.

The inks were jetted onto a bed of nylon (PA12) particles (Vestosint® x1556). The nylon particles had an average particle size of approximately 50 μm. The layer thickness was approximately 100 μm. Each layer was printed with one of the two separate photoluminescent inks in pre-designated photoluminescent composite areas. The carbon black fusing ink was printed in both the photoluminescent composite areas and in other body portions. The inks were printed at contone levels of 255 for the photoluminescent inks and 80 for the fusing ink. A single pass of each of the inks was performed for the photoluminescent composite layer. After the single pass, a curing pass was performed.

The printer powder supply and powder bed were filled with the nylon particles. The supply temperature was set at 110° C. and the print bed temperature was set at 130° C. A heater under the print bed was set at 150° C. The print speed was set at 10 inches per second (ips) and the cure speed was set at 7 ips. Curing was performed using two 300 W bulbs placed approximately 1 cm away from the surface of the powder bed.

The 3-dimensional printed part included printed photoluminescent features that were relatively unobservable under ambient lighting. However, under UV light, the photoluminescent emission from the photoluminescent features became very prominent. The edges of the printed photoluminescent features were very clear, providing clearly distinguishable luminescent features under UV light. In particular, the photoluminescent features included circles, hexagons, and triangles.

Example 2

The same general printing parameters as described in Example 1 were used to print another 3-dimensional printed part having a photoluminescent composite layer on a surface of the part body. The 3-dimensional printed part was printed in predesignated areas with separate photoluminescent inks including 1.3 wt % Carboxy YG 100 nm nanospheres in an aqueous vehicle, 2.6 wt % Carboxy YG 100 nm nanospheres in an aqueous vehicle, 2.5 wt % Carboxy YO 400 nm nanospheres in an aqueous vehicle, 2.7 wt % Carboxy NYO 200 nm nanospheres in an aqueous vehicle, 2.6 wt % Carboxy YG 200 nm nanospheres in an aqueous vehicle, 2.6 wt % Carboxy BB 100 nm nanospheres in an aqueous vehicle, and 1.0 wt % Carboxy EU 200 nm nanospheres in an aqueous vehicle, respectively, each available from Polysciences, Inc.

Some of the features printed with the different photoluminescent inks were marginally observable under ambient lighting. However, these features could likely be masked using a specific colorant in combination with a particular photoluminescent ink. Under UV light, the photoluminescent features were clearly visible, some with stronger photoluminescence than others. The 2.5 wt % Carboxy YO 400 nm nanosphere ink and the 1.0 wt % Carboxy EU 200 nm nanosphere ink both had relatively strong photoluminescence in comparison with the other photoluminescent inks under the specific wavelength of UV light used to photoexcite the various photoluminescent features.

Example 3

The same general printing parameters as described in Example 1 were used to print yet another 3-dimensional printed part having a photoluminescent composite layer on a surface of the part body. The 3-dimensional printed part was printed in predesignated areas with separate photoluminescent inks including 1 wt % InP/ZnS quantum dots (oleylamine ligand) in an aqueous vehicle (available from NN-Labs), 0.1 wt % InP/ZnS quantum dots (carboxylic acid ligand) in an aqueous vehicle (available from NN-Labs), and 1 wt % NanoDOT™ CIS-700 in an aqueous vehicle (available from Voxtel).

The features printed with the different photoluminescent inks were largely unobservable under ambient lighting. However, under UV light, the photoluminescent features were clearly visible, some with stronger photoluminescence than others. The 1 wt % NanoDOT™ CIS-700 had relatively strong photoluminescence in comparison with the other photoluminescent inks under the specific wavelength of UV light used to photoexcite the various photoluminescent features.

Example 4

In this Example, a 3-dimensional printing system can be used to print various 3-dimensional printed parts having a photoluminescent security feature encapsulated within the part body beneath a surface layer. Specifically, photoluminescent inks and fusing inks were printed from separate ink jet pens. The photoluminescent inks used had formulations as follows:

| Component | Weight (g) for 25 g Ink |
|---|---|
| Ink #1 - 3.0% Fluorescein | |
| Water | 18.31 |
| Organic Co-solvent Vehicle | 5.94 |
| Fluorescein, Na+ salt | 0.75 |
| Ink #2 - 0.5% Rhodamine B | |
| Water | 18.94 |
| Organic Co-solvent Vehicle | 5.94 |
| Rhodamine B | 0.13 |

| Ink #3 - 3.0% Fluorescein | |
|---|---|
| Component | Weight (g) for 25 g Ink |
| Water | 18.46 |
| Organic Co-solvent Vehicle | 5.75 |
| Non-ionic Wetting Agent | 0.04 |
| Fluorescein, Na+ salt | 0.75 |

| Ink #4 - 0.5% Rhodamine B | |
|---|---|
| Component | Weight (g) for 25 g Ink |
| Water | 19.09 |
| Organic Co-solvent Vehicle | 5.75 |
| Non-ionic Wetting Agent | 0.04 |
| Rhodamine B | 0.13 |

The fusing ink was formulated as follows:

| Components in ink formulation | Weight % of component | Weight for 10 kg Ink (g) |
|---|---|---|
| Organic Co-solvent Vehicle | 20.00 | 2000.00 |
| Anionic Surfactant | 0.50 | 50.00 |
| Nonionic Surfactants | 0.8 | 80.00 |
| Polymer Dispersant | 0.01 | 1.00 |
| Chelating Agent | 0.04 | 4.00 |
| Biocides | 0.32 | 32.00 |
| Carbon black | 5.00 | 2500.00 |
| DI Water | 73.33 | 5333.00 |
| Total Fluid | | 10000.00 |

The inks were jetted onto a bed of nylon (PA12) particles (Vestosint® x1556, available from Evonik). The nylon particles had an average particle size of approximately 50 μm. The layer thickness was approximately 100 μm. Each 3-dimensional printed part was printed with a subsurface particle layer having a security feature. On these layers the photoluminescent ink was printed into a security area to form the security feature using a contone level of 255, a print resolution of 1200×1200, and a drop weight of 9 ng to achieve a print density of about 1 mg solids/cubic centimeter (cc) for the rhodamine B inks and about 6 mg solids/cc for the fluorescein inks. The fusing ink was printed in both the security area and non-security areas of the subsurface particle layer using a contone level of 80, a resolution of 1200×1200, and a drop weight of 11.5 ng to achieve a print density of about 4 mg solids/cc. A single pass of each of the inks was performed for the photoluminescent composite layer. After the single pass, a curing pass was performed.

A surface particle layer was printed on top of the subsurface fused layer. The surface particle layer included a masking area or feature printed over the subsurface security feature, as well as non-masking areas. The non-masking areas of the surface particle layer were prepared in the same manner as the non-security areas of the subsurface particle layer. The masking area was printed by reducing the contone level of the fusing ink to 40, while using the same resolution and drop weight as in other areas. This was sufficient to decrease the print density in the masking area to about 2 mg solids/cc.

The printer powder supply and powder bed were filled with the nylon particles. The supply temperature was set at 110° C. and the print bed temperature was set at 130° C. A heater under the print bed was set at 150° C. The print speed was set at 10 inches per second (ips) and the cure speed was set at 7 ips. Curing was performed using two 300 W bulbs placed approximately 1 cm away from the surface of the powder bed.

The security features encapsulated within the 3-dimensional printed parts were unobservable under ambient lighting. However, under UV irradiation, the photoluminescent emission from the photoluminescent features became reasonably visible in ambient lighting. However, using UV irradiation in a dark room resulted in a very prominent photoluminescent security feature that was visible through the masking area.

The invention claimed is:

1. A 3-dimensional printing material set, comprising:
a particulate build material comprising thermoplastic polymer particles;
an inkjet dopant composition consisting of:
a liquid carrier consisting of:
from about 73 wt % to about 76 wt % of water;
a co-solvent; and
optionally a surfactant; and
a dopant dispersed or dissolved in the liquid carrier, wherein the dopant is present in an amount ranging from about 0.1 wt % to about 5 wt % and consists of particles that are selected from at least one of photoluminescent particles, dielectric particles, magnetic particles, ceramic particles, semi-conductor particles, electrically-conducting particles, and polymer nanoparticles; and
an inkjet fusing composition consisting of a liquid vehicle water and a fusing agent capable of absorbing electromagnetic radiation to produce heat, wherein;
the fusing agent is selected from the group consisting of carbon black, near-infrared absorbing pigments, tungsten bronzes, molybdenum bronzes, metal nanoparticles, and combinations thereof; and
the liquid vehicle consists of water.

2. The 3-dimensional printing material set as defined in claim 1, further comprising an inkjet ink composition comprising at least one colorant.

3. The 3-dimensional printing material set as defined in claim 2 wherein the at least one colorant of the inkjet ink composition is present in the inkjet ink composition in an amount ranging from 0.5 wt % to 10 wt %.

4. The 3-dimensional printing material set as defined in claim 1 wherein the dopant is the dielectric particles, and wherein the dielectric particles are selected from the group consisting of $BaTiO_3$, PMN-PT (lead magnesium niobate-lead titanate), $PbNb_2O_6$, PLZT (lead-lanthanum-zirconium-titanate), $SiO_2$, $Al_2O_3$, $Ta_2O_5$, $TiO_2$, $SrTiO_3$, $ZrO_2$, $HfO_2$, $HfSiO_4$, $La_2O_3$, $Y_2O_3$, $\alpha$-$LaAlO_3$, $CaCu_3Ti_4O_{12}$, $La_{1.8}Sr_{0.2}NiO_4$, and combinations thereof.

5. The 3-dimensional printing material set as defined in claim 4, wherein the dielectric particles have a particle size of from 1 nm to 100 nm.

6. The 3-dimensional printing material set as defined in claim 1, wherein thermoplastic polymer particles of the particulate build material are selected from at least one of a polyamide, a polyurethane, a polycarbonate, a polystyrene, and polyolefin.

7. The 3-dimensional printing material set as defined in claim 1 wherein the inkjet fusing composition is colorless.

8. The 3-dimensional printing material set as defined in claim 1 wherein the fusing agent is present in the inkjet fusing composition in an amount ranging from 0.1 wt % to 20 wt %.

9. A 3-dimensional printing material set, comprising:
a particulate build material comprising thermoplastic polymer particles;
an inkjet dopant composition consisting of:
  water; and
  a dopant dispersed or dissolved in the water, wherein the dopant is present in an amount ranging from about 0.1 wt % to about 5 wt % and consists of particles that are selected from at least one of photoluminescent particles, dielectric particles, magnetic particles, ceramic particles, semi-conductor particles, electrically-conducting particles, and polymer nanoparticles; and
an inkjet fusing composition consisting of a liquid vehicle and a fusing agent capable of absorbing electromagnetic radiation to produce heat, wherein:
  the fusing agent is selected from the group consisting of carbon black, near-infrared absorbing pigments, tungsten bronzes, molybdenum bronzes, metal nanoparticles, and combinations thereof; and
  the liquid vehicle consists of water.

10. The 3-dimensional printing material set as defined in claim 9, further comprising an inkjet ink composition comprising at least one colorant.

11. The 3-dimensional printing material set as defined in claim 10 wherein the at least one colorant of the inkjet ink composition is present in the inkjet ink composition in an amount ranging from 0.5 wt % to 10 wt %.

12. The 3-dimensional printing material set as defined in claim 9 wherein the dopant is the dielectric particles, and wherein the dielectric particles are selected from the group consisting of $BaTiO_3$, PMN-PT (lead magnesium niobate-lead titanate), $PbNb_2O_6$, PLZT (lead-lanthanum-zirconium-titanate), $SiO_2$, $Al_2O_3$, $Ta_2O_5$, $TiO_2$, $SrTiO_3$, $ZrO_2$, $HfO_2$, $HfSiO_4$, $La_2O_3$, $Y_2O_3$, $\alpha\text{-}LaAlO_3$, $CaCu_3Ti_4O_{12}$, $La_{1.8}Sr_{0.2}NiO_4$, and combinations thereof.

13. The 3-dimensional printing material set as defined in claim 12, wherein the dielectric particles have a particle size of from 1 nm to 100 nm.

14. The 3-dimensional printing material set as defined in claim 9, wherein thermoplastic polymer particles of the particulate build material are selected from at least one of a polyamide, a polyurethane, a polycarbonate, a polystyrene, and polyolefin.

15. The 3-dimensional printing material set as defined in claim 9 wherein the inkjet fusing composition is colorless.

16. The 3-dimensional printing material set as defined in claim 9 wherein the fusing agent is present in the inkjet fusing composition in an amount ranging from 0.1 wt % to 20 wt %.

* * * * *